T. A. KLENKE.
VEHICLE SUSPENSION.
APPLICATION FILED FEB. 11, 1913.
1,119,021.
Patented Dec. 1, 1914.
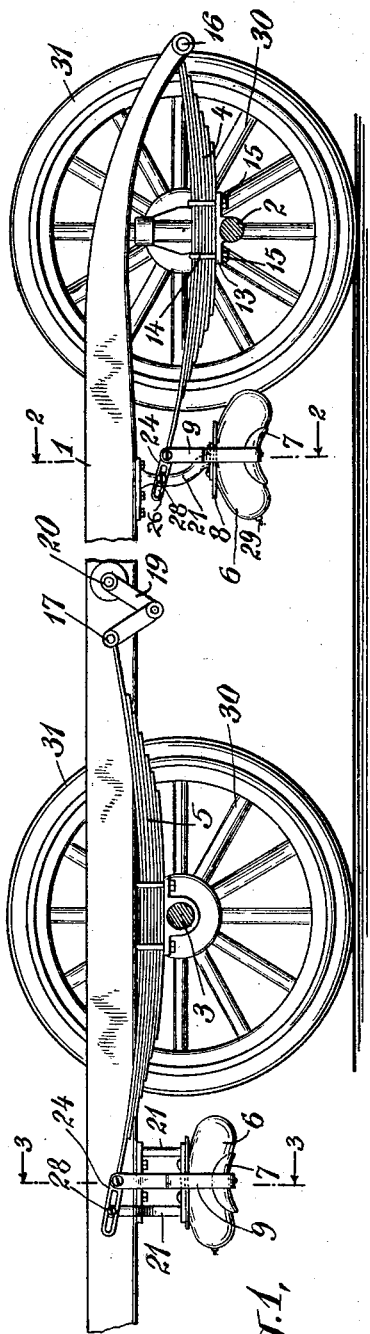
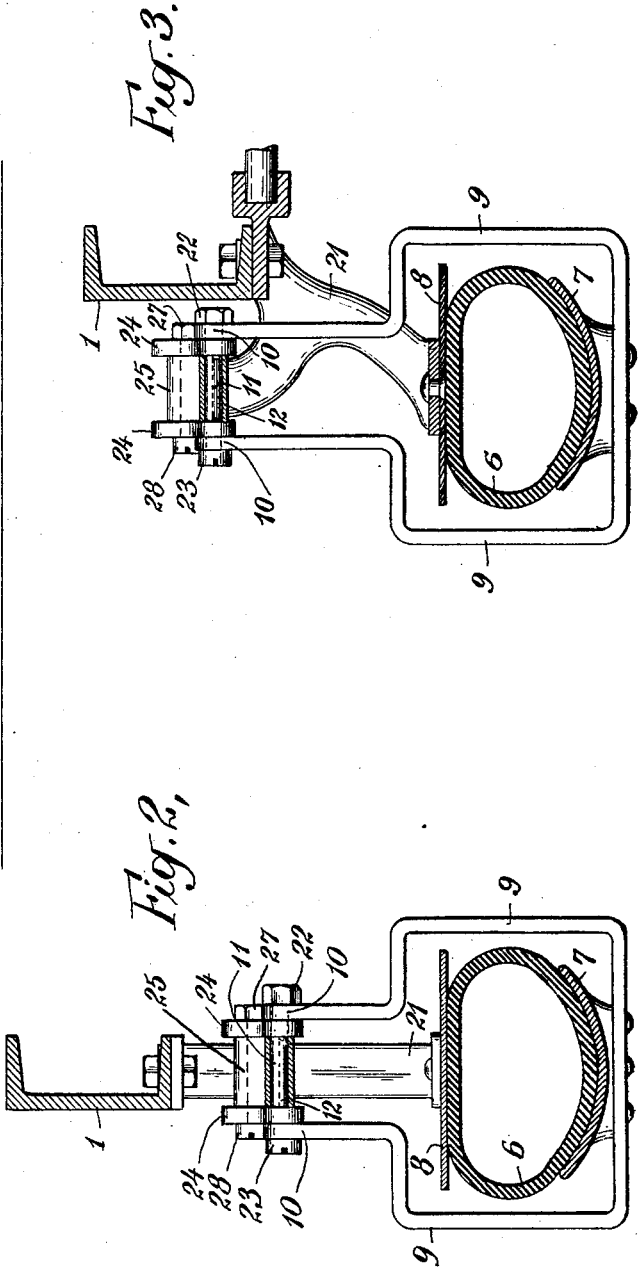

UNITED STATES PATENT OFFICE.

THEODORE A. KLENKE, OF NEW YORK, N. Y., ASSIGNOR TO KLENKE CUSHION AXLE COMPANY, A CORPORATION OF NEW YORK.

VEHICLE SUSPENSION.

1,119,021.  Specification of Letters Patent. Patented Dec. 1, 1914.

Application filed February 11, 1913. Serial No. 747,627.

*To all whom it may concern:*

Be it known that I, THEODORE A. KLENKE, a citizen of the United States, and a resident of the city of New York, in the county and State of New York, have invented a new and useful Improvement in Vehicle Suspensions, of which the following is a specification.

My invention relates to vehicle suspensions and to the use of pneumatic bags in the running gear between the axle and the body.

It is of especial value in connection with automobiles. Its object is to enable a pneumatic bag to be used in combination with a spring, such as the ordinary leaf spring, in a simple and effective manner, giving full play to the resiliency of both the spring and the pneumatic bag and permitting the axle and body to rise and fall vertically with reference to each other, and giving full play to the vertical compression of the pneumatic bag while at the same time reducing to a minimum strains or stresses that would otherwise pass through the bag and tend to disrupt it.

It consists in the novel devices and combinations herein shown and described.

In the drawings accompanying this specification and forming part hereof, I have shown my invention in its preferred form and as embodied in an automobile.

Referring to such specific embodiment as thus shown, Figure 1 is a side elevation of a part of the chassis or body of the car with the nearer wheels and some of their connecting parts removed for purposes of clearness, and showing my improved device as applied in its preferred form to an automobile; Fig. 2 is a vertical cross-section taken on the lines 2—2 of Fig. 1; Fig. 3 is a vertical cross-section taken on the lines 3—3 of Fig. 1.

Referring to the drawings, 1 is the chassis or body of the car, 2 the front axle, and 3 the rear axle.

4 is the front spring and 5 the rear spring which, as shown, are ordinary leaf springs.

6 is a pneumatic bag carried between two supports, a lower support 7 connected to the spring, upon which support the bag rests, and an upper support 8 connected to the body of the car and pressing upon the bag. As shown, the lower support 7 is suspended from one end of the spring 4 or 5 by means of arms 9, 9 pivoted at 10 to a stud 11 inclosed and fast in the curled up end 12 of one end of spring 4 or 5. Preferably the pneumatic bag is suspended from the rear end of each spring, although if desired it may be placed at the opposite end, or a pneumatic bag may be suspended from each end of each spring. As the connections in such a case would be a mere duplication of those shown, I have not illustrated them in the drawings. The springs may be secured to the axles by any suitable means, for example, as shown by means of plates 13, 13, clips 14, 14 and nuts 15, 15. The forward end of spring 4 as shown in the drawings, is pivoted to the downwardly bowed forward end of the body at the point 16. The forward end of the rear spring 5 is pivoted at 17 to links 18, 19, the latter pivoted to the body at 20. The upper support 8 is fast with the body 1. As shown, it is carried by a downwardly projecting standard 21 bolted to the under side of the body.

I provide connections between the two supports 7 and 8 permitting vertical play between them to compress the bag variably as the axle and body of the car move relatively to each other, and permitting slight longitudinal movement between the two supports 7 and 8. These connections, however, prevent all other relative movements between the two supports, for the purpose of preventing or reducing to a minimum the strains or stresses that otherwise would pass through the pneumatic bag 6 and disrupt it. These connections, as shown, consist of the arms 9 pivoted on the stud 11 and held securely in place by nut 22 and shoulder 23 on stud 11, and by links 24, 24 pivoted at their lower end to stud 11 and supported and connected at their upper end to standard 21 by means of a pin 25 passing through and fast in standard 21 and passing through a slot 26 in each link 24, the parts being held in place by means of a nut 27 and collar 28 on pin 25. Through these connections between the upper and lower support or the parts to which they are connected, all lateral play between the two supports is effectually prevented and all longitudinal play, except to a very limited degree as the spring lengthens or contracts. In this way side strains and stresses through the bag are effectually prevented and all longitudinal strains are reduced to a minimum. It is well known that when a pneumatic bag is subjected to such strains and stresses it will very rapidly disrupt, making it wholly unfitted for use in vehicle suspensions where subjected to such strains and stresses. In order to further reduce any small strains due to the aforesaid small longitudinal relative motion of the two supports, I preferably make the upper plate 8 flat and the lower plate 7 convex in longitudinal section and concave as viewed in cross-section; and preferably make the bag with an upper convex surface so as readily to roll on the upper plate and with its lower surface convex in longitudinal section and concave in cross section to correspond with the shape of lower support 7. I also preferably connect the lower support 7 to the end of the spring pivotally so that lower support 7 is free to swing longitudinally to a certain extent.

By the above means, as the spring lengthens or shortens, the longitudinal strain or stress likely to be occasioned in the bag thereby is reduced to a minimum and is largely, if not entirely, compensated for in its injurious effect by the slight rocking of the lower support and of the bag with it on account of their coöperating shapes and the rolling of the upper surface of the bag on the under surface of the upper support. This prevents any injurious effects from being produced by any slight longitudinal play of the two supports relative to each other.

The form of standard preferably used for the upper support for the rear of the car is shown as of slightly different shape from the standard 21 for the upper support at the front of the car, as clearly appears in Fig. 3; but otherwise the connections with the lower support are the same.

29 represents the ordinary valve for the pneumatic bag by means of which it may be blown up when necessary. In practice I find it necessary to carry only a relatively low pressure in the pneumatic bag, far below that required in pneumatic tires for automobiles; and in practice I find that this pressure rarely has to be renewed. Of course, the pneumatic bags are not subject to puncture and there is very little wear or tear upon them. Their life is practically as long as if not longer than that of the car itself.

30, 30 are the wheels, and these are shown as provided with solid tires 31, 31.

By means of my improvement very simple and efficient cushioning means are provided for the car, enabling the dispensing with pneumatic tires on the wheels; springs and pneumatic bags can be used in connection with one another, each working at its best advantage without any interference with the other; pneumatic bags can be used without any tendency to disrupt them through strains or stresses passing through the bags; and the resilient means employed are simple and can be readily connected to any car without great difficulty and at relatively low cost.

What I claim as new and desire to secure by Letters Patent, is:

1. In a vehicle, the combination of a spring carried by the axle, a pneumatic bag provided with a convex upper surface, a lower support for the bag pivotally connected to one end of the spring, a flat upper plate support for the bag fast with the body and pressing upon the bag, and connections between the two supports permitting play vertically and slightly longitudinally between them but preventing all other relative movement between the two supports, whereby all side strains and stresses through the pneumatic bag will be eliminated and longitudinal stresses be reduced to a minimum and be compensated for by the rolling action of the bag against the upper support.

2. In a vehicle, the combination of a spring carried by the axle, a pneumatic bag provided with a convex upper surface, and provided with a lower surface convex in longitudinal section and concave in cross section, a lower support for the bag convex in longitudinal section and concave in cross section to conform to the lower surface of the pneumatic bag and pivotally connected to one end of the spring, a flat upper support for the bag connected to the body and pressing upon the bag, and connections between the two supports permitting vertical play and a slight longitudinal play between them but preventing all other relative movement between the two supports, whereby all side strains and stresses through the pneumatic bag will be eliminated and longitudinal stresses be reduced to a minimum and be compensated for by the rolling action of the bag against the upper support.

3. In a vehicle suspension, the combination of a pneumatic bag convex on its upper surface and on its lower surface convex in longitudinal section and concave in cross section, a lower support connected to the axle and pivotally supported, and on its upper surface conforming to the shape of the under side of the pneumatic bag so as to securely hold the bag in place on the support, and a flat upper support resting upon the bag and connected with the body of the vehicle, whereby longitudinal strains or stresses tending to pass through the pneumatic bag will be reduced to a minimum or compensated for by the swinging of the lower support and the bag with it and the rolling of the latter on the flat under surface of the upper support.

In testimony whereof, I have signed my name to this specification, in the presence of two subscribing witnesses.

THEODORE A. KLENKE.

Witnesses:
EDWIN SEGER,
JOHN O. GEMPLER.